United States Patent Office 2,994,710
Patented Aug. 1, 1961

2,994,710
NOVEL POLYHALOGENOPOLYCYCLOALKENE DERIVATIVES AS FOLIAGE FUNGICIDES
Juan Gabriel Morales, Modesto, Calif., assignor to Shell Oil Company, New York, N.Y., a corporation of Delaware
No Drawing. Filed Dec. 27, 1957, Ser. No. 705,504
10 Claims. (Cl. 260—429)

The present invention is concerned with salts and esters of carbamic, thiocarbamic and dithiocarbamic acid having substituted thereon a polyhalogenopolycycloalkene radical. These compounds have been found to possess significant toxicity toward and inhibition of a wide variety of fungi.

The need for efficient and economical fungicidal and fungistatic compositions has long been manifest. In spite of this fact, however, a vast number of the compounds employed as fungicides, have been found lacking in one or more of the basic requirements of a satisfactory fungicide. In order to be commercially useful a fungicidal composition must be compatible with adjuvants and other active ingredients; it must be economical; it should be soluble in common solvents and stable; and most important, it must not be toxic to the plants to which it is applied or to animal life. A prohibitive degree of phytotoxicity under the conditions utilized for fungus control and toxicity toward warm-blooded animals are among the most common shortcomings of present fungicides.

It is, consequently, the principal object of the present invention to provide new and novel compounds which are effective as fungicides yet do not manifest prohibitive phytotoxicity or toxicity toward warm blooded animals such as man.

Another object of the present invention is to provide new and novel fungicidal compounds which can be economically prepared, distributed and applied to plants.

Yet another object of the present invention is to provide economical and stable fungicidal compositions containing these compounds.

Still another object of the present invention is to provide a method of combating fungi by applying these compositions to plants.

Other objects, features and advantages will be apparent from the following description read in conjunction with the appended claims.

Generally speaking, the present invention is concerned with organic compounds wherein one terminal position is occupied by a polyhalogenopolycycloalkene and the other terminal position is occupied by carbamate or thiocarbamate radical of the type

wherein each Z individually represents oxygen or sulfur, the nitrogen atom of the carbamate or thiocarbamate radical being between the polyhalogenopolycycloalkene substituent of the molecule and the

substituent of the molecule. In other words, the nitrogen atom is proximate to the polyhalogenopolycycloalkene substituent of the molecule.

The halogenated cycloalkene portion of the molecule is attached directly to the nitrogen atom of the carbamate or thiocarbamate portion of the molecule, or alternatively, the cycloalkene portion of the molecule may be separated from the nitrogen atom of the carbamate or thiocarbamate by an alkyl, aryl or aralkyl group.

Of the polyhalogenopolycycloalkenes which occupy one terminal position of the compounds of the present invention, halogenated bicyclo(2.2.1)hept-5-ene rings as shown in the following structural formula are preferred:

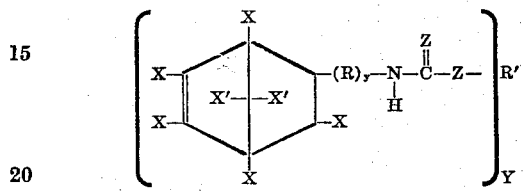

Of equal interest is the dimethanonaphthalene ring structure shown in the following structural formula:

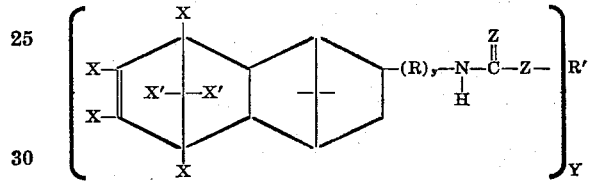

The present invention also encompasses the polycyclic structures represented by the following general formula:

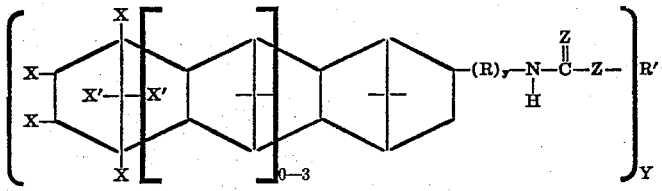

In these formulae X represents hydrogen or halogen and X' represents hydrogen, halogen or an alkoxy group. Of the alkoxy groups which may be employed, methoxy groups are preferred. Both X and X' are preferably chlorine.

R may be a straight chain, branched chain or cyclic alkylene group of from 1–10 carbon atoms, an arylene group such as tolylene, phenylene, naphthylene or anthrylene or an aralkylene group wherein the alkylene portion contains 1–10 carbons and the aryl portion is chosen from groups such as tolyl, phenyl, naphthalenyl or anthracenyl. Of these R is preferably a straight chain alkyl group. y is 0 to 10. Each Z individually represents oxygen or sulfur. R' may be a straight chain, branched chain or cyclic alkyl group of from 1–10 carbon atoms, an aryl group such as tolyl, phenyl-, naphthyl, or anthryl or an aralkyl group wherein the alkyl portion contains 1–10 carbon atoms and the aryl portion is a tolyl, phenyl, naphthyl or anthryl radical. When R' is an organic radical, the molecule is an ester; when R' is an alkylene or arylene group, the molecule is a diester; i.e., Y=2.

Alternatively, R' may represent a metallic ion in which case the molecule will be a metallic salt. Among the many metallic ions which may be empoyed in the present invention are those of iron, cobalt, nickel, manganese, chromium, antimony, tungsten, arsenic, lead, tin, aluminum, boron, magnesium, calcium, zinc, strontium, cadmium, barium, calcium, zinc, magnesium, beryllium, sodium, potassium, mercury, sodium, copper, silver. It will be readily understood that the present invention is not limited to the specifically enumerated metallic ions but encompasses all metallic salts of these substituted carbamic, thiocarbamic or dithiocarbamic acids.

Y is a whole number which may range between 1 and 7 but preferably does not exceed 3; Y is equivalent to the valence of R'. For example, when R' is a ferric ion, Y is 3; when R' is a zinc ion Y is 2; when R' is an isopropyl radical, Y is 1; when R' is ethylene, Y=2. Both carbamate, thiocarbamate and dithiocarbamate salts and esters are encompassed by the present invention.

Examples of specific compounds encompassed by the present invention follow:

Copper(1,4,5,6,7,7 - hexachlorobicyclo(2.2.1)hept - 5 - en-2-ylmethyl)-carbamate
Methyl (1,4,5,6,7,7 - hexachlorobicyclo(2.2.1)hept-5-en-2-ylmethyl)thiocarbamate
Zinc (1,4,5,6,7,7 - hexachlorobicyclo(2.2.1)hept - 5-en-2-ylmethyl)dithiocarbamate
Ferric (1,4,5,6,7,7 - hexachlorobicyclo(2.2.1)hept-5-en-2-ylmethyl)trithiocarbamate
Isopropyl (1,4,5,6 - tetrachloro - 7,7 - dimethoxybicyclo-(2.2.1)hept-5-en-2-yl)thiocarbamate
Decyl (1,4,5,6,7,7 - hexafluorobicyclo(2.2.1)hept-5-en-2-ylmethyl)carbamate
Phenyl(1,4,5,6,7,7 - hexabromobicyclo(2.2.1)hept - 5 - en-2-ylmethyl)carbamate
Decylphenyl ((1,4,5,6,7,7-hexachlorobicyclo(2.2.1)hept-5-en-2-yl)naphthyl)carbamate
Anthryl ((1,4,5,6 - tetrachloro - 7,7 - dimethoxybicyclo-(2.2.1)hept-5-en-2-yl)tolyl)carbamate
Naphthyl (5,6,7,8,9,9 - hexachloro-1,2,3,4,4a,5,8,8a-octahydro - 1,4,5,8 - dimethanonaphthalen - 2 - yl)thiocarbamate
Tolyl(10 - (5,6,7,8,9,9 - hexabromo - 1,2,3,4,4a,5,8,8a - octahydro - 1,4,5,8, - dimethanonaphthalen - 2 - yl) - decyl)carbamate
Manganese (1,4,5,6,7,7-hexachlorobicyclo(2.2.1)hept-5-en-2-ylmethyl)dithiocarbamate
Chromium (1,4,5,6,7,7 - hexabromobicyclo(2.2.1)hept-5-en-2-ylmethyl)dicarbamate
Lead(3 - (1,4,5,6,7,7 - hexafluorobicyclo(2.2.1)hept - 5-en-2-ylpropyl)dicarbamate
Aluminum (1,4,5,6,7,7 - hexachlorobicyclo(2.2.1)hept-5-en-2-ylmethyl)tricarbamate
Copper (1,4,5,6,7,7 - hexachlorobicyclo(2.2.1)hept. - 5 - en-2-ylmethyl)dithiocarbamate Generally speaking the carbamate esters of the present invention may be conveniently made by reacting an ester of chloroformim acid with the appropriate polyhalogenopolycycloalkene amine. The carbamate is formed with the splitting off of hydrochloric acid. The preparation of the polyhalogenopolycycloalkene amines is disclosed in co-pending application S.N. 705,781, filed December 30, 1957. The thiocarbamate esters of the present invention may be prepared from polyhalogenopolycycloalkene isothiocyanate and the appropriate alcohol. For example, in the reaction of the isothiocyanic acid ester of 1,4,5,6,7,7 - hexachlorobicyclo(2.2.1)hept - 5 - ene - 2 - methanol with methanol, methyl (1,4,5,6,7,7-hexachlorobicyclo(2.2.1)hept - 5 - en - 2 - ylmethyl)thiocarbamate is produced. The isothiocyanate itself may be conveniently made by the addition of allyl isothiocyanate to hexachlorocyclopentadiene. The metallic salts of the present invention may be prepared by treating the polyhalogenopolycycloalkene amine with $CS_2$ under alkaline conditions and adding the appropriate metallic salt to the mixture. For example, zinc (1,4,5,6,7,7-hexachlorobicyclo(2.2.1)hept - 5 - en - 2 - ylmethyl)dithiocarbamate is prepared by treating 1,4,5,6,7,7 - hexachlorobicyclo-(2.2.1)hept-5-ene-2-methylamine with $CS_2$ and NaOH and adding zinc sulfate to the reaction mixture.

Examples of preparations of compounds encompassed by the present invention follow:

EXAMPLE I

*Isopropyl (1,4,5,6,7,7 - hexachlorobicyclo(2.2.1)hept - 5-en-2-ylmethyl)carbamate*

To a solution of 8 g. of pyridine in 100 ml. of benzene was added 12.3 g. (0.1 mole) of isopropyl chloroformate giving an exothermic reaction and a solid precipitate. A solution of 33 g. of 1,4,5,6,7,7-hexachlorobicyclo(2.2.1)hept-5-ene-2-methylamine prepared in accordance with the disclosure in co-pending application S.N. 705,781, filed December 30, 1957, in 50 ml. of benzene was added and the mixture refluxed for 16 hours. The mixture was cooled and washed with water. The benzene layer was dried and concentrated to give a solid, M.P. 85–87°. One recrystallization from hexane gave 19.7 g. (50% yield) of product, M.P. 85–70°.

*Analysis.*—Calcd. for $C_{12}H_{13}Cl_6NO_2$: Cl, 51.2; N, 3.37. Found: Cl, 51.1, 51.2; N, 3.2.

EXAMPLE II

*Methyl (1,4,5,6,7,7 - hexachlorobicyclo(2.2.1)hept-5-en-2-ylmethyl)thiocarbamate*

A solution of 20 g. of the isothiocyanic acid ester of 1,4,5,6,7,7 - hexachlorobicyclo(2.2.1)hept - 5 - ene - 2 - methanol in 70 ml. of methanol was refluxed for 4.5 hours. Removal of the solvent left 21 g. of a yellow oil which was crystallized from hexane to give 20.8 g. (96% yield) of methyl (1,4,5,6,7,7 - hexachlorobicyclo-(2.2.1)hept-5-en-2-ylmethyl)thiocarbamate, M.P. 110–112°. A small portion was recrystallized twice from hexane to give pure product, M.P. 115–116°.

*Analysis.*—Calcd. for $C_{18}H_8Cl_6NO_2$: Cl, 52.8; S, 7.95. Found: Cl, 52.5; S, 8.2.

EXAMPLE III

*Zinc (1,4,5,6,7,7 - hexachlorobicyclo(2.2.1)hept-5-en-2-ylmethyl)dithiocarbamate*

Thirty-three grams of 1,4,5,6,7,7-hexachlorobicyclo-(2.2.1)hept - 5-ene-2-methylamine (0.1 mole) was dissolved in 12 ml. (0.2 mole) of $CS_2$ and the mixture treated with 10% NaOH until alkaline. A solution of 23 g. (0.8 mole) of $ZnSO_4 \cdot 7H_2O$ in 100 ml. of water was added with stirring. The crude product was dissolved in methanol and undissolved solid was filtered. Concentration of the filtrate gave 24 g. (55% yield) of product as a yellow solid, M.P. 165°.

*Analysis.*—Calcd for $C_{18}H_{12}Cl_{12}N_2S_4Zn$: Cl, 48.9; Zn, 7.5. Found: Cl, 48.7; Zn, 7.4.

EXAMPLE IV

*Ferric (1,4,5,6,7,7-hexachlorobicyclo(2.2.1)hept-5-en-2-ylmethyl)dithiocarbamate*

1,4,5,6,7,7 - hexachlorobicyclo(2.2.1)hept - 5 - ene - 2-methylamine tridichloride, 73 g., was suspended in 100 ml. of $H_2O$ and 48 ml. of $CS_2$ and 10% NaOH solution was added until alkaline. Ferric nitrate enneahydrate, 27 g., dissolved in 100 ml. water was then added to the above mixture with vigorous stirring. A black precipitate was obtained which was washed with water and dried; yield 84.5 g. (99%). The product shrinks at 145° (dec.), but does not melt below 250°.

*Analysis.*—Calcd. for $C_{27}H_{18}Cl_{18}N_3S_6Fe$: Cl, 50.3; Fe, 4.4. Found: Cl, 49.4; Fe, 4.5.

The compounds of the present invention possess fungicidal activity on a wide variety of plant pathogens. In the foliage fungicide screen, three varieties of bean plants and four foliage fungus diseases were employed. Employing these hosts and pathogens the chemicals were screened for general as well as specific control activity and for phytotoxicity.

*Phaseolus vulgaris* var. Pinto
*P. vulgaris* var. Black Valentine
*P. limensis* var. Fordhook 242
*Uromyces phaseoli* var. typica (rust)
*Erysiphe polygoni* (powdery mildew)
*Colletotrichum lindemuthianum* (anthracnose)
*Phytophthora phaseoli* (downy mildew)

These four bean pathogens are of economic importance and represent each of the four classes of fungi. *P. phaseoli* is closely allied with *P. infestans,* the important potato and tomato pathogen. Thus, with the above selection, chemicals can be routinely screened for general or specific disease control activity and for phytotoxicity on a susceptible plant type.

The test is carried out according to the following procedure. Test chemicals are prepared as 1% w./v. stock solutions in a solvent. The stock is diluted for spraying using a diluent consisting of distilled water+solvent (1:1) or with distilled water+two solvents (2:2:1). Triton X-155, at 0.005% w. is used as a wetting agent for each concentration of toxicant. All chemicals are initially tested at a single concentration of 1000 p.p.m. If acceptable disease control is shown, chemicals are retested at 1000 p.p.m. and the next lowest dilution of 500 p.p.m. Chemicals continuing to show disease control are retested in this fashion until the maximum effective concentration is determined. Phytotoxicity assessments are expressed at the maximum "safe" concentration.

Spray applications are made using a laboratory sprayer. The bean plants are selected for use at a stage when the two primary leaves are about three-quarters expanded. To facilitate deposit, the primary leaves are oriented to a vertical position by pinning them to a small wire staff. Either the upper or lower epidermis of the leaf is exposed to the spray stream, depending on the surface to be inoculated.

With the mist type spray and the diluent mixture which is applied, a drying interval of 1–2 hours is sufficient before inoculation with spore suspensions using a specially constructed atomizer. Inoculations with bean mildew are made by dusting conidia over treated plants in the greenhouse.

After 24 hours incubation at 19° C. and 100% humidity, the plants are removed to the controlled-environment greenhouse for symptom development. Disease control and phytotoxicity assessments are made within 7 days.

The following table summarized the results of screening.

centrations of 0.24% w., 0.12% w. and 0.06% w. These correspond respectively to 2, 1 and 0.5 lbs. toxicant/100 gallons of spray. Plants were sprayed to the runoff stage dried for 24 hours, and inoculated with test fungus spores. After inoculation, the plants were held for 24–48 hours in a humidified incubation chamber at 19° C. They were then removed to the greenhouse for disease and phytotoxicity development.

Crops and diseases used were tomato or potato blight (*Phytophthora infestans*), celery blight (*Septoria apiigraveolentis*), bean mildew (*Erysiphe polygoni*), bean rust (*Uromyces appendiculatus*) and cucumber anthracnose (*Colletotrichum lagenarum*).

From four replicated plants per concentration, a percentage disease control figure was obtained, which was based upon the improvement shown over the untreated checks as follows:

$$100 \times \frac{\left(\begin{array}{c}\text{Disease rating of untreated check}\\ -\text{disease rating of treatment of standard}\end{array}\right)}{\text{disease rating of untreated check}}$$

The percent disease control for a treatment was next compared with the percent control for the standard fungicide (captan at 0.24% w. of formulated chemical) as follows:

Foliage-fungicide activity index (F-F.A.I.)
$$= \frac{\text{percent control for treatment}}{\text{percent control for standard}} \times 100$$

Where the disease control for the test chemical and standard was equivalent, the index value was 100. Values above 100 indicated vast superiority.

In most cases comparisons were made at the 0.24% w. (2 lbs./100 gal.) concentration.

Readings for plant injury were obtained on tomatoes, beans, celery, and cumumber. Both chronic toxicity (yellowing, distortion, etc.) and acute toxicity (tissue death) were recorded. The scale used was from 0–400.

FOLIAGE-FUNGICIDE SCREEN

| Chemical Compound | Disease Control Min. Effective Conc. (p.p.m.) | | | | Phytotoxicity Max. "Safe" Conc. (p.p.m.) | | |
|---|---|---|---|---|---|---|---|
| | P.p.[a] | E.p. | U.p. | C.l. | L[b] | P | BV |
| Methyl (1,4,5,6,7,7-hexachlorobicyclo-(2.2.1) hept-5-en-2-ylmethyl)thiocarbamate | 1,000 | 500–1,000 | 500 | 250 | 1,000 | 1,000 | 1,000 |
| Zinc (1,4,5,6,7,7-hexachlorobicyclo-(2.2.1) hept-5-en-2-ylmethyl)dithiocarbamate | 250 | 2,000 | 250–500 | 65–125 | 2,000 | 2,000 | 2,000 |
| Ferric (1,4,5,6,7,7-hexachlorobicyclo-(2.2.1) hept-5-en-2-ylmethyl)dithiocarbamate | 500 | 1,000 | | 32 | 1,000 | 500 | 500 |

[a] P.p.=*Phytophthora phaseoli* (downy mildew of lima bean); E.p.=*Erysiphe polygoni* (bean powdery mildew); U.p.=*Uromyces phaseoli* (bean rust); C.l.=*Colletotrichum lindemuthianum* (bean anthracnose).
[b] L=Lima bean; P=Pinto bean; BV=Black Valentine bean.

The effectiveness of the present compounds as fungicides is further evidenced by the following tests:

To obtain disease control data, chemicals were sprayed mainly as emulsions, solutions or suspensions using concentrations of 0 represented no visible poisoning and 400 was the most severe manifestation.

The following table summarized the results of these tests.

FOLIAGE FUNGICIDE TEST
[Foliage-Fungicide Activity Index]

| | Activity Index at 0.24% Conc. (Upper figure) and percent control at 0.06% (lower figure) | | | | | Phytotoxicity at 0.24% (upper figure) and 0.06% conc. (lower figure), respectively | | | | |
|---|---|---|---|---|---|---|---|---|---|---|
| | P.i.[a] | S.a. | E.p. | U.a. | C.l. | Combined Index | T[b] | C | B | Cu | Combined |
| Isopropyl (1,4,5,6,7,7-hexachlorobicyclo(2.2.1)hept-5-en-2-ylmethyl)-carbamate. | 8 / — | — / — | 80 / 50 | 67 / 67 | 27 / 10 | — / — | 0 / 0 | 0 / 0 | 50 / 0 | 100 / 0 | 38 / 0 |
| Methyl (1,4,5,6,7,7-hexachlorobicyclo(2.2.1)hept-5-en-2-methyl)-thiocarbamate. | 120 / 83 | — / — | 83 / 50 | — / 90 | 125 / 100 | 81 / — | 200 / 100 | 100 / 50 | 125 / 100 | 400 / 250 | 206 / 125 |
| Zinc (1,4,5,6,7,7-hexachlorobicyclo(2.2.1)hept-5-en-2-ylmethyl)-dithiocarbamate. | 76 / 43 | 100 / 38 | 100 / 42 | 108 / 100 | 111 / 100 | 99 / 65 | 100 / 0 | 0 / 0 | 50 / 0 | 100 / 50 | 63 / 13 |

[a] P.i.=Phytophthora infestans (late blight tomato); S.a.=Septoria apii-graveolentis (late blight of celery); E.p.=Erysiphe polygoni bean powdery mildew); U.a.=Uromyces appendiculatus (bean rust); C.l.=Colletotrichum Lagenarium (Cucumber Anthracnose).
[b] T=Tomato; C=Celery; B=Bean; Cu=Cucumber.

The active compounds of the present invention may be used alone or in combination with other fungicidal, viridal, insecticidal or acaricidal materials, the action on which may be either internal or external, with plant nutritives, plant hormones and the like. Wetting agents, and if necessary or desirable, stickers such as the heavy hydrocarbon oils with a minimum viscosity of 10° Engler at 50° C. can be present. Any conventional wetting agent which will not react with the toxicant, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions for example, in water, solvents such as oils, emulsifiers, emulsion stabilizers, and the like may be added if desired. For example, glucose is known to protect tomato plants against damage by certain substances having a phytotoxic effect when employed in concentrated form.

The salts and esters of the present invention may be applied by means of spraying. Spraying of the plants to be treated may be performed with aqueous emulsions, solutions or suspensions of the active agents. The spray liquid is generally applied at a rate of from about 75 to 50 gallons per acre. If spraying is effected with smaller quantities of liquid as in low volume spraying, high concentrations of the active agents should be employed. If desired, a minor amount of the order of about 0.01 to about 0.05% by weight, of a wetting agent may be added to aid in forming a suspension of the salt in the aqueous medium. Any of the conventional wetting agents can be employed. Particular suitable wetting agents are the sodium salts of a mixture of secondary heptadecyl sulfates, sold commercially under the name "Teepol" and polyethylene glycol ethers of alkyl phenols sold under the name of "Triton X-100" and "Triton X-155." Preferably concentrate compositions comprising an active compound of the present invention and a suitable wetting agent are prepared, and the concentrate then dispersed in water prior to use.

A further form in which the fungicidal compounds of the present invention may be applied consists of solutions of the active ingredient in suitable inert liquid or semi-solid diluents, in which the active ingredient is present in molecularly dispersed form. The form in which the agents to be employed are applied to the objects treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations or the material of the storage vessel. Examples of suitable solvents are high boiling oils, e.g. oils of vegetable origin such as castor oil, etc., and lower-boiling solvents with a flash point of at least 30° C., such as carbon tetrachloride, ethylene dichloride, acetylene tetrachloride, sorbent naphtha, etc. Mixtures of solvents may also be used. Non-aromatic petroleum oils and xylene are commonly employed.

The active compounds of the present invention may also be applied in the form of dusts utilizing as the inert vehicle such materials as tricalcium phosphate, precipitated chalk, bentonite, kaolin and kieselguhr, etc.

These compounds may also be employed in the form of aerosols. For this purpose the active ingredient is dissolved, or dispersed in a solvent boiling below room temperature at atmospheric pressure.

I claim as my invention:

1. A compound having the structural formula

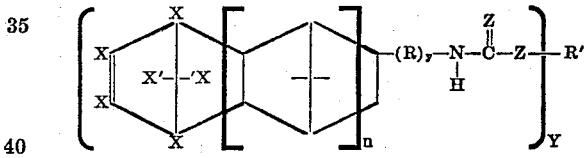

wherein X is a halogen, X' is a member of the group consisting of hydrogen, halogen and methoxy, R is a member of the group consisting of alkylene of 1 to 10 carbon atoms, y is a whole number from 0 to 1, Z is a member of the group consisting of oxygen and sulfur atoms, R' is a member of the group consisting of aliphatic hydrocarbon of 1 to 10 carbon atoms, aromatic hydrocarbon selected from the group consisting of benzene, naphthalene and anthracene, and aromatic-aliphatic hydrocarbon selected from the group consisting of benzene-aliphatic, naphthalene-aliphatic and anthracene-aliphatic, in which aliphatic is in each case aliphatic hydrocarbon of 1 to 10 carbon atoms, and a metal having a valence of from 1 to 3 inclusive, Y is a whole number from 1 to 3, and n is a whole number from 0 to 1.

2. A compound in accordance with claim 1, wherein n is 0.

3. Metal (1,4,5,6,7,7-hexachlorobicyclo(2,2,1)-hept-5-en-2-yl-$C_{1-10}$-alkyl)dithiocarbamate, the metal having a valence of from 1 to 3, inclusive.

4. Metal (1,4,5,6,7,7-hexachlorobicyclo(2,2,1)-hept-5-en-2-ylmethyl)dithiocarbamate, the metal having a valence of from 1 to 3, inclusive.

5. $C_{1-10}$-alkyl (1,4,5,6,7,7-hexachlorobicyclo(2,2,1)-hept-5-en-2-ylmethyl)dithiocarbamate.

6. Isopropyl (1,4,5,6,7,7-hexachlorobicyclo(2,2,1)hept-5-en-2-ylmethyl) carbamate.

7. Isopropyl (1,4,5,6,7,7 - hexahalobicyclo(2,2,1)hept-5-en-2-ylmethyl) thiocarbamate.

8. Methyl (1,4,5,6,7,7-hexachlorobicyclo(2,2,1)hept-5-en-ylmethyl) thiocarbamate.

9. Zinc (1,4,5,6,7,7 - hexachloro(2,2,1)hept - 5 - en-2-ylmethyl) dithiocarbamate.

10. Ferric (1,4,5,6,7,7-hexachlorobicyclo(2,2,1)hept-5-en-2-ylmethyl) dithiocarbamate.

References Cited in the file of this patent

UNITED STATES PATENTS

| | | |
|---|---|---|
| 2,015,045 | Teichmann | Sept. 17, 1935 |
| 2,572,020 | Floyd | Oct. 12, 1951 |
| 2,607,797 | McKinney | Aug. 19, 1952 |
| 2,638,431 | Harry | May 12, 1953 |
| 2,642,373 | Dazzi | June 16, 1953 |
| 2,717,263 | McKinney | Sept. 6, 1955 |